(12) United States Patent
Chen et al.

(10) Patent No.: US 8,897,044 B2
(45) Date of Patent: Nov. 25, 2014

(54) ELECTRONIC DEVICE HAVING COMPLETE POWER-SAVING MECHANISM

(75) Inventors: Yen-Ming Chen, Taipei (TW); Wei-Lu Wang, Taipei (TW)

(73) Assignee: Pegatron Corporation, Taipei (TW)

( * ) Notice: Subject to any disclaimer, the term of this patent is extended or adjusted under 35 U.S.C. 154(b) by 427 days.

(21) Appl. No.: 13/421,370

(22) Filed: Mar. 15, 2012

(65) Prior Publication Data

US 2012/0236613 A1   Sep. 20, 2012

(30) Foreign Application Priority Data

Mar. 17, 2011   (TW) .............................. 100109152 A

(51) Int. Cl.
*H02M 7/12* (2006.01)
*G06F 1/26* (2006.01)
*H02M 1/00* (2006.01)

(52) U.S. Cl.
CPC ......... *G06F 1/26* (2013.01); *H02M 2001/0032* (2013.01); *Y02B 70/16* (2013.01)
USPC .......................................... 363/126; 363/147

(58) Field of Classification Search
USPC ................. 363/37, 47–50, 52–53, 74–77, 82, 363/89–90, 97, 125–127, 142, 147; 700/296; 713/320–24, 330
See application file for complete search history.

(56) References Cited

U.S. PATENT DOCUMENTS

| | | | |
|---|---|---|---|
| 5,926,394 A * | 7/1999 | Nguyen et al. ................. | 323/271 |
| 5,995,384 A * | 11/1999 | Majid et al. ................. | 363/21.18 |
| 6,111,230 A * | 8/2000 | Cao et al. ....................... | 219/501 |
| 6,266,776 B1 | 7/2001 | Sakai | |
| 6,469,479 B2 * | 10/2002 | Kim ................................ | 323/267 |
| 8,050,059 B2 * | 11/2011 | Sotiriou ........................... | 363/16 |
| 8,054,144 B2 * | 11/2011 | Kausch .......................... | 333/174 |
| 8,289,744 B2 * | 10/2012 | Takahashi et al. ............. | 363/126 |
| 2004/0158756 A1 * | 8/2004 | Totsuka et al. ................. | 713/323 |

(Continued)

FOREIGN PATENT DOCUMENTS

| | | |
|---|---|---|
| CN | 2909698 | 6/2007 |
| CN | 201293971 | 8/2009 |
| TW | 201020749 | 6/2010 |
| TW | M390456 | 10/2010 |

OTHER PUBLICATIONS

"Office Action of Taiwan Counterpart Application", issued on Nov. 18, 2013, p. 1-p. 6.

*Primary Examiner* — Adolf Berhane
*Assistant Examiner* — Nusrat Quddus
(74) *Attorney, Agent, or Firm* — J.C. Patents

(57) ABSTRACT

An electronic device including a power switch, a switch unit, a power supply unit and a control unit is provided. Two power ends of the power switch are connected in parallel with two connecting terminals of the switch unit. The power supply unit generates a system voltage by a power come from the power switch or the switch unit. When the two power ends of the power switch are conducted for a predetermined time, the power is provided to the power supply unit and the electronic device starts up. Furthermore, the control unit controls the switch unit to conduct the two connecting terminals, so that the power is still provided to the power supply unit through the switch unit after the two power ends are disconnected. When the electronic device is shut down, the control unit controls the switch unit to disconnect the two connecting terminals.

8 Claims, 3 Drawing Sheets

(56) References Cited

U.S. PATENT DOCUMENTS

| | | |
|---|---|---|
| 2006/0212137 A1 | 9/2006 | Sone |
| 2009/0177900 A1* | 7/2009 | Sawyers et al. ............... 713/300 |
| 2010/0135050 A1* | 6/2010 | Sonobe ...................... 363/21.07 |
| 2011/0134664 A1* | 6/2011 | Berghegger .................... 363/49 |
| 2011/0179291 A1* | 7/2011 | Weng et al. ................... 713/300 |

* cited by examiner

ELECTRONIC DEVICE HAVING COMPLETE POWER-SAVING MECHANISM

CROSS-REFERENCE TO RELATED APPLICATION

This application claims the priority benefit of Taiwan application serial no. 100109152, filed on Mar. 17, 2011. The entirety of the above-mentioned patent application is hereby incorporated by reference herein and made a part of this specification.

BACKGROUND OF THE INVENTION

1. Technology Field

The disclosure relates to an electronic device. Particularly, the disclosure relates to an electronic device having a complete power-saving mechanism.

2. Description of Related Art

An electronic device is generally equipped with a corresponding power device to provide power required by the system, for example, a power adapter used by a mobile phone and a notebook computer, or a power supplier used by a computer. Generally, the power device generates a voltage required by the system through an alternating current (AC)/direct current (DC) converter or a DC/DC converter. The AC/DC converter coverts an AC voltage into a DC voltage required by the system through a transformer and a rectifier voltage stabilizing circuit, which causes relatively large power consumption.

To effectively use energy, the existing power device generally provides two types of power including a main power and a standby power. When the electronic device is shut down, the power device continually provides the standby power, and a control unit in internal of the electronic device determines whether or not to perform a start-up procedure by detecting a pressed state of a power switch. Namely, when the electronic device is shut down or is waiting to start up, the power device itself has a certain amount of power consumption. For example, when a notebook computer is shut down and a battery thereof is in a fully charged state, and a power adapter thereof still has power consumption of 100-300 milliwatts. A general flat panel computer still has power consumption of 20 milliwatts in a shut down state.

In other words, when the existing electronic device is shut down or is waiting to start up, it still has a certain amount of power consumption, which causes waste of power and environment pollution. Moreover, although a power plug can be unplugged to avoid the power consumption of the electronic device in the shut down state, frequent plugging/unplugging of the power plug may not only cause damage of a power line or a plug wire, but can easily cause a risk of fire of the electric wire. Moreover, regarding some tablet computers, power of theses devices cannot be removed, and after being manufactured, a battery thereof is probably charged to at least a half of a total power, so that in case that the power cannot be removed, the whole tablet computer continually consumes power of about 20 milliwatts. Therefore, when the user purchases a tablet computer which has been manufactured for two or three months, the user has to recharge the tablet computer and can not promptly use the tablet computer.

SUMMARY

The disclosure of the invention is directed to an electronic device, when the electronic device is shut down, a power supplied to the electronic device is cut off to improve power-saving performance of the system.

The disclosure of the invention provides an electronic device including a power switch, a switch unit, a power supply unit and a control unit. The power switch has a first power end and a second power end, and the first power end is used for receiving a power. The switch unit has a first connecting terminal and a second connecting terminal, and the first connecting terminal and the second connecting terminal of the switch unit are connected in parallel to the first power end and the second power end of the power switch. The power supply unit is connected to the second power end of the power switch and the second connecting terminal of the switch unit. The control unit is connected to the power supply unit and the switch unit. When the first power end and the second power end are conducted for a predetermined time, the power is provided to the power supply unit and the electronic device starts up. Moreover, the control unit controls the switch unit to conduct the first connecting terminal and the second connecting terminal, so that the power is still provided to the power supply unit through the switch unit after the first power end and the second power end are disconnected. When the electronic device is shut down, the control unit controls the switch unit to disconnect the first connecting terminal and the second connecting terminal.

In an embodiment of the invention, the power is an alternating current (AC) voltage, and the power supply unit includes a power adaptor and a power circuit. The power adaptor is connected to the second power end of the power switch, and converts the AC voltage into a direct current (DC) voltage. Moreover, the power circuit is connected to the power adaptor, and converts the DC voltage into a system voltage.

In an embodiment of the invention, the power is a DC voltage, and the power supply unit includes a power circuit. The power circuit is connected to the second power end of the power switch, and converts the DC voltage into a system voltage.

In an embodiment of the invention, the control unit includes an embedded controller and a switch circuit. The embedded controller maintains one of a plurality of state signals to a first level when the electronic device starts up, and maintains the state signals to a second level when the electronic device is shut down. Moreover, the switch circuit is connected to the embedded controller. When one of the state signals is the first level, the switch circuit provides a setting signal having the second level to control the switch unit to conduct the first connecting terminal and the second connecting terminal. When the state signals have the second level, the switch circuit provides the setting signal having the first level to control the switch unit to disconnect the first connecting terminal and the second connecting terminal.

In an embodiment of the invention, the switch unit includes a relay, a control circuit and a second switch. The relay has a first connecting terminal and a second connecting terminal. The control circuit is connected to the relay. Moreover, the second switch is connected to the control circuit and the switch circuit of the control unit.

According to the above descriptions, in the invention, the two connecting terminals of the switch unit are connected in parallel to the two power ends of the power switch, and when the electronic device is shut down, the two connecting terminals of the switch unit are disconnected to cut off the power supplied to the electronic device. In this way, the electronic device achieves an effect of zero power consumption under the shut down state, so as to improve the power-saving performance of the system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
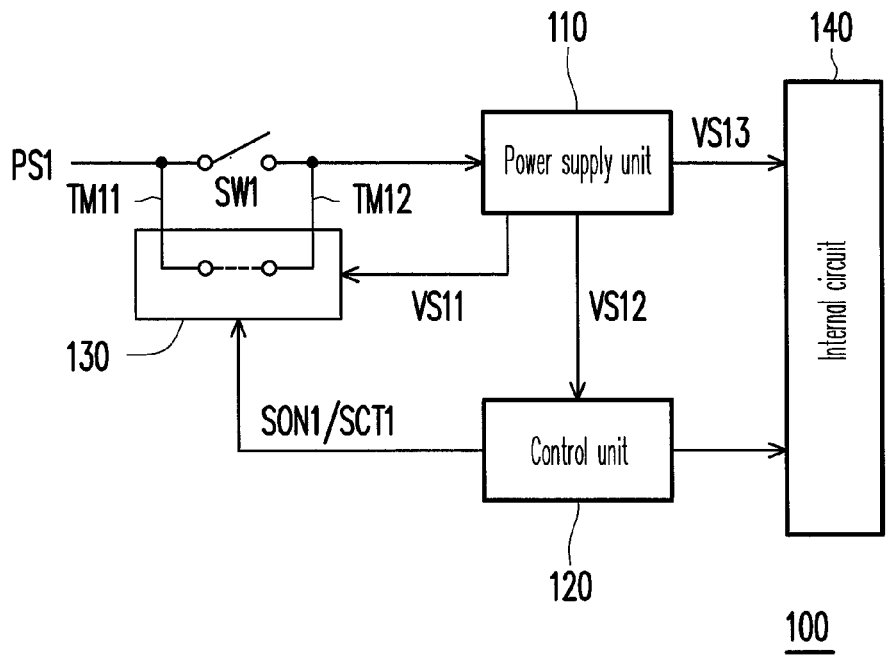
FIG. 1 is a block diagram of an electronic device according to an embodiment of the invention.

FIG. 1 is a block diagram of an electronic device according to an embodiment of the invention. Referring to FIG. 1, the electronic device 100 includes a power switch SW1, a power supply unit 110, a control unit 120, a switch unit 130 and an internal circuit 140. The electronic device 100 is, for example, a tablet computer, a desktop computer, a notebook computer, or an all in one (AIO) computer.

Referring to FIG. 1, a first power end of the power switch SW1 receives a power PS1, and a second power end of the power switch SW1 is connected to the power supply unit 110. In operation, when the power switch SW1 is pressed, the first power end and the second power end are conducted for a predetermined time (for example, several hundreds milliseconds). Now, the power PS1 is supplied to the power supply unit 110, and the electronic device 100 starts up. Moreover, the power supply unit 110 provides a plurality of system voltages VS11-VS13 according to the power PS1 for supplying to the switch unit 130, the control unit 120 and the internal unit 140.

Further, the system voltage VS12 is used for driving the control unit 120 to operate. In the present embodiment, a period of time has to be spent for driving the control unit 120 by the system voltage VS12. Therefore, in order to ensure the power supply unit 110 continually providing the system voltage VS12 before the control unit 120 is driven, in the present embodiment, in an initial stage of starting up the electronic device 100, a first connecting terminal TM11 and a second connecting terminal TM12 of the switch unit 130 can be conducted through the system voltage VS11, so that the power supply unit 110 can continually receive the power PS1 to completely drive the control unit 120.

Moreover, after the control unit 120 is driven, the control unit 120 provides a power-off signal SCT1 or a power-on signal SON1 to the switch unit 130 according to an operation mode of the electronic device 100. For example, when the electronic device 100 is in a start-up/working state, the control unit 120 provides the power-on signal SON1 to the switch unit 130. Now, the switch unit 130 conducts the first connecting terminal TM11 and the second connecting terminal TM12 according to the power-on signal SON1, so that the power supply unit 110 can continually receive the power PS1. In other words, the control unit 120 controls the switch unit 130 to conduct the first connecting terminal TM11 and the second connecting terminal TM12, so that the power PS1 is still provided to the power supply unit 110 through the switch unit 130 after the first power end and the second power end of the power switch SW1 are disconnected.

On the other hand, when the electronic device 100 is shut down, the control unit 120 provides the power-off signal SCT1 to the switch unit 130. Now, the switch unit 130 disconnects the first connecting terminal TM11 and the second connecting terminal TM12 according to the power-off signal SCT1, so that the power supply unit 110 cannot receive the power PS1. In other words, when the electronic device 100 is shut down, the power PS1 supplied to the electronic device 100 is completely cut off, so that the electronic device 100 does not consume power. Therefore, the electronic device 100 of the present embodiment can achieve an effect of zero power consumption without unplugging a power plug. In this way, the electronic device 100 of the present embodiment not only improves the power-saving performance of the system, but also reduces a risk of fire of the electric wire caused by damage of a plug wire.

Figure 2:
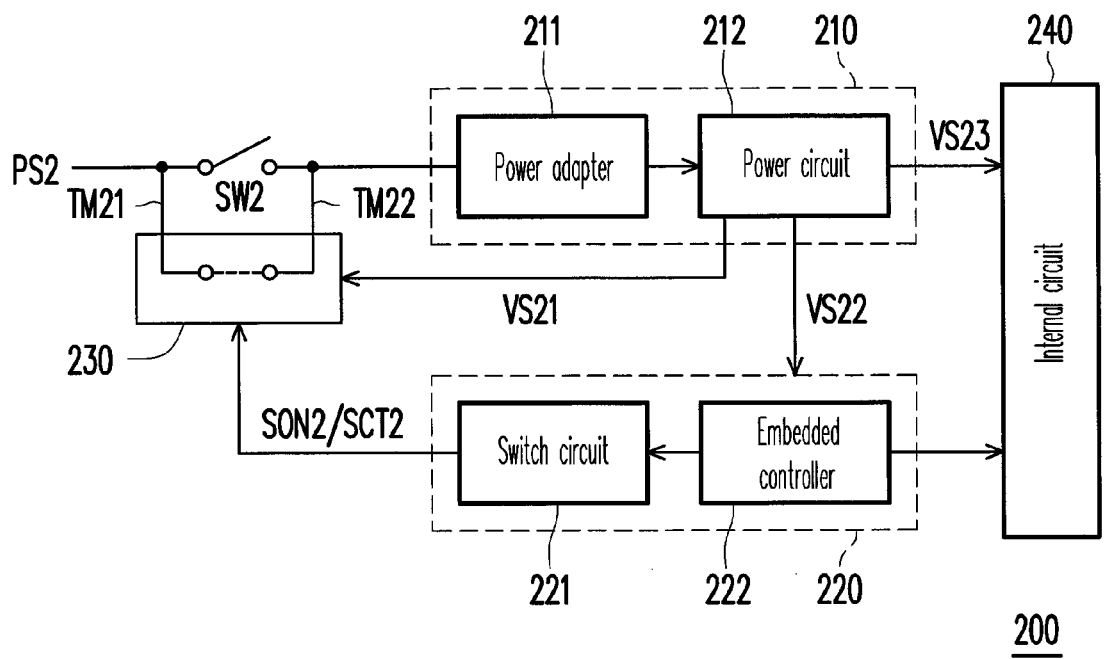
FIG. 2 is a block diagram of an electronic device according to another embodiment of the invention.

FIG. 2 is a block diagram of an electronic device according to another embodiment of the invention. Referring to FIG. 2, the electronic device 200 includes a power switch SW2, a power supply unit 210, a control unit 220, a switch unit 230 and an internal circuit 240. The electronic device 200 is, for example, a flat panel computer, a desktop computer, a notebook computer, or an AIO computer.

Referring to FIG. 2, when the power switch SW2 is pressed, a first power end and a second power end thereof are conducted for a predetermined time. Now, a power PS2 is supplied to the power supply unit 210, and the electronic device 200 starts up. Moreover, the power supply unit 210 provides a plurality of system voltages VS21-VS23 according to the power PS2. For example, in the present embodiment, the power supply unit 210 includes a power adapter 211 and a power circuit 212, and the power PS2 is an AC voltage. The power adapter 211 is connected to the second power end of the power switch SW2, and converts the power PS2 (the AC voltage) from the power switch SW2 into a DC voltage. Moreover, the power circuit 212 is connected to the power adapter 211 to convert the DC voltage into the system voltages VS21-VS23.

On the other hand, the control unit 220 is driven by the system voltage VS22 to operate. Moreover, in order to ensure that the control unit 220 is completely driven, in an initial stage of starting up the electronic device 200, a first connecting terminal TM21 and a second connecting terminal TM22 of the switch unit 230 can be conducted through the system voltage VS21, so that the power supply unit 210 can continually receive the power PS2 before the control unit 220 is completely driven.

Moreover, when the control unit 220 is driven to operate, the control unit 220 provides a power-off signal SCT2 or a power-on signal SON2 according to an operation mode of the electronic device 200. For example, in the present embodiment, the control unit 220 includes a switch circuit 221 and an embedded controller 222. The switch circuit 221 is connected to the embedded controller 222 and the switch unit 230, and the embedded controller 222 is connected to the power supply unit 210 and the internal circuit 240.

In view of a whole operation, when the electronic device 200 is in the start-up/working state, the embedded controller 222 maintains one of a plurality of state signals to the first level (for example, logic 1). On the other hand, regarding the switch circuit 221, when one of the state signals is maintained to the first level (for example, logic 1), the switch circuit 221 provides a setting signal having a second level (for example, logic 0) to serve as the power-on signal SON2.

Figure 3:
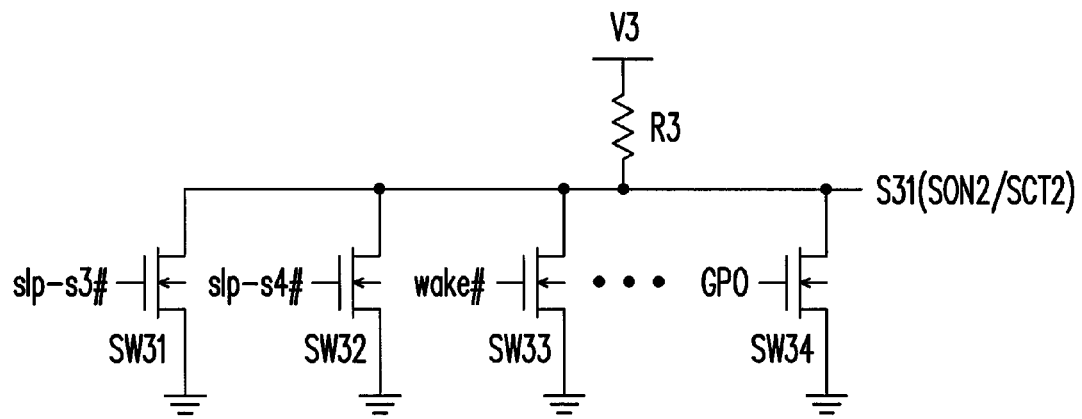
FIG. 3 is a circuit diagram of a switch circuit according to an embodiment of the invention.

For example, FIG. 3 is a circuit diagram of a switch circuit according to an embodiment of the invention. Referring to FIG. 3, the switch circuit 221 includes a resistor R3 and a plurality of switches SW31-SW34. A first power end of the resistor R3 receives a voltage V3, and a second power end of the resistor R3 generates a setting signal S31. Moreover, the switches S31-SW34 are connected between the second power end of the resistor R3 and a ground terminal. In addition, the state signals include a sleep control signal slp-s3#, a sleep control signal slp-s4#, a wakeup control signal wake#, and a specific control signal GPO. The specific control signal GPO is a specific function set by a user through a basic input/output system (BIOS), which is used to ensure that a signal provided by a general input and output port GIPO is maintained to the first level.

In view of a whole operation, when the electronic device 200 is in a sleep state, the sleep control signal slp-s3# is maintained to the first level (for example, logic 1). Therefore, the switch SW31 is turned on to pull down a level of the setting signal S31 to a ground voltage. Namely, the switch circuit 221 generates the setting signal S31 having the second level (for example, logic 0), which is regarded as the power-on signal SON2. Besides, when a specific event occurs, for example, the electronic device 200 is switched to a standby state, a hibernation state, the sleep state or a specific state set by the user, the sleep control signal slp-s4#, the wakeup control signal wake#, or the specific control signal GPO is switched to the first level (for example, logic 1). Now, a part of the switches SW31-SW34 are turned on, and the switch circuit 221 generates the setting signal S31 having the second level (for example, logic 0), i.e. the power-on signal SON2.

On the other hand, when the electronic device 200 is shut down, the embedded controller 222 maintains the state signals to the second level (for example, logic 0). Moreover, when the state signals are maintained to the second level (for example, logic 0), the switch circuit 221 provides the setting signal having the first level (for example, logic 1) to serve as the power-off signal SCT2.

For example, as shown in FIG. 3, when the electronic device 200 is shut down, the state signals such as the sleep control signal slp-s3#, the sleep control signal slp-s4#, the wakeup control signal wake#, and the specific control signal GPO, etc. are all maintained to the second level (for example, logic 0). In this way, the switches SW31-SW34 are all turned off, and the level of the setting signal S31 is pulled up to the voltage V3. Namely, the switch circuit 221 now generates the setting signal S31 having the first level (for example, logic 1), which is regarded as the power-off signal SCT2.

Referring to FIG. 2, regarding the power-on signal SON2 and the power-off signal SCT2 provided by the switch circuit 221, the switch unit 230 turns on the first connecting terminal TM21 and the second connecting terminal TM22 according to the power-on signal SON2 such that the power supply unit 210 can continually receive the power PS2. Moreover, the switch unit 230 turns off the first connecting terminal TM21 and the second connecting terminal TM22 according to the power-off signal SCT2, so as to cut off the power PS1 supplied to the electronic device 200.

Figure 4:
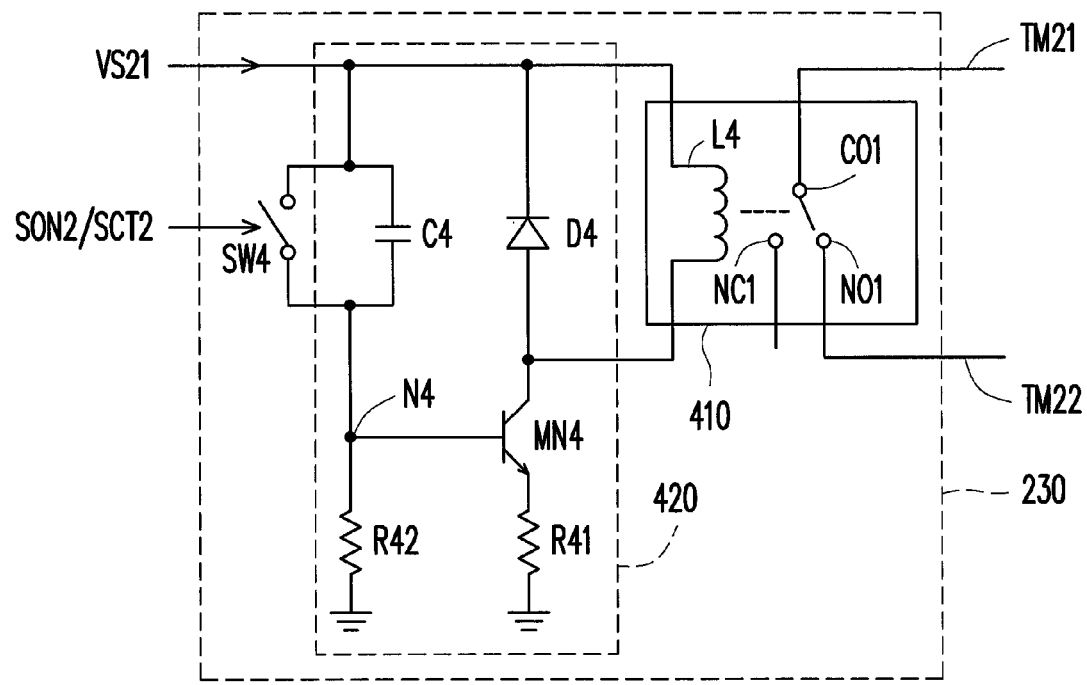
FIG. 4 is a circuit diagram of a switch unit according to an embodiment of the invention.

For example, FIG. 4 is a circuit diagram of a switch unit according to an embodiment of the invention. The switch unit 230 includes a relay 410, a control circuit 420 and a switch SW4. The relay 410 has a first connecting terminal TM21 and a second connecting terminal TM22. The control circuit 420 is connected to the relay 410. Moreover, the switch SW4 is connected to the control circuit 420 and the switch circuit 221 of the control unit 220.

Further, the control circuit 420 includes a diode D4, an N-channel transistor MN4, resistors R41 and R42 and a capacitor C4. Moreover, the relay 410 includes a coil L4, a common contact CO1, a normally close contact NC1 and a normally open contact NO1. In view of connection, the common contact CO1 and the normally open contact NO1 of the relay 410 are respectively connected to the first connecting terminal TM21 and the second connecting terminal TM22 of the relay 410 to control a conducting state of the first connecting terminal TM21 and the second connecting terminal TM22.

Moreover, a first power end of the coil L4 of the relay 410 is connected to the power supply unit 210 to receive the system voltage VS21, and a second power end of the coil L4 of the relay 410 is connected to a drain of the N-channel transistor MN4. A cathode of the diode D4 is connected to the first power end of the coil L4, and an anode of the diode D4 is connected to the second power end of the coil L4. A first power end of the resistor R41 is connected to a source of the N-channel transistor MN4, and a second power end of the resistor R41 is connected to the ground terminal. A first power end of the capacitor C4 is connected to the power supply unit 210, and a second power end of the capacitor C4 is connected to a gate of the N-channel transistor MN4. A first power end of the resistor R42 is connected to the second power end of the capacitor C4, and a second power end of the resistor R42 is connected to the ground terminal. A first power end of the switch SW4 is connected to the first power end of the capacitor C4, and a second power end of the switch SW4 is connected to the second power end of the capacitor C4.

In view of a whole operation, the capacitor C4, the resistor R41 and the resistor R42 are used to determine a bias point of the N-channel transistor MN4. Moreover, the N-channel transistor MN4 is used to drive the coil L4, and the diode D4 is used to provide a discharge path of the coil L4. Here, when the switch unit 230 receives the power-on signal SON2, the switch SW4 is turned on, and a voltage of a node N4 is pulled up to the system voltage VS21. As the voltage of the node N4 is pulled up, the N-channel transistor MN4 is turned on to drive the coil L4, and the common contact CO1 of the relay 410 is connected to the normally open point NO1. Namely, when the switch unit 230 receives the power-on signal SON2, the first connecting terminal TM21 and the second connecting terminal TM22 of the switch unit 230 are connected.

On the other hand, when the switch unit 230 receives the power-off signal SCT2, the switch SW4 is turned off. Now, the system voltage VS21 starts to charge the capacitor C4, such that the voltage of the node N4 is decreased. As the voltage of the node N4 is decreased, the N-channel transistor MN4 cannot be turned on, and the common contact CO1 of the relay 410 is connected to the normally close point NC1. In other words, when the switch unit 230 receives the power-off signal SCT2, the first connecting terminal TM21 and the second connecting terminal TM22 of the switch unit 230 cannot be connected.

It should be noticed that before the control unit 220 is driven, the switch unit 230 cannot receive the power-on signal SON2 and the power-off signal SCT2. Therefore, in the initial stage of starting up the electronic device 200, the N-channel transistor MN4 of the switch unit 230 is maintained to a transient turn-on state through a delay mechanism formed by the capacitor C4 and the resistor R42, such that the first connecting terminal TM21 and the second connecting terminal TM22 are electrically connected transiently. In this way, the power supply unit 210 can continually receive the power PS2 before the control unit 220 is completely driven.

A reason why the first connecting terminal TM21 and the second connecting terminal TM22 of the switch unit 230 are maintained to a transient electrical connection state in the initial stage of starting up the electronic device 200 is that under a DC transient response, the capacitor C4 that receives the system voltage VS21 in the beginning is regarded as short-circuited, so that in the initial stage of starting up the electronic device 200, the voltage of the node N4 is maintained to the system voltage VS21. Moreover, the capacitor C4 has to wait for a delay time before being charged to the system voltage VS21. Namely, the voltage of the node N4 is gradually decreased within the delay time.

A magnitude of the delay time is determined by impedance values of the capacitor C4 and the resistor R42. Therefore, the delay time can be set to be greater than a driving time of the control unit 220 by adjusting the impedance values of the capacitor C4 and the resistor R42. In this way, before the control unit 220 is driven, the switch SW4 is maintained to the turn-on state within the delay time through the transient response of the capacitor C4, so that the first connecting terminal TM21 and the second connecting terminal TM22 of the switch unit 230 are maintained to the transient electrical connection state in the initial stage of starting up the electronic device 200.

In short, in the turn-on state of the electronic device 200, the first connecting terminal TM21 and the second connecting terminal TM22 of the switch unit 230 are electrically connected, such that the power supply unit 210 can continually provide the system voltages VS21-VS23. Conversely, when the electronic device 200 is shut down, the first connecting terminal TM21 and the second connecting terminal TM22 of the switch unit 230 are disconnected, so as to cut off the power supplied to the electronic device 200.

In this way, the electronic device 200 achieves an effect of zero power consumption under the shut down state, so as to improve the power-saving performance of the system. Moreover, since the electronic device 200 does not consume power under the shut down state, in the start-up process, the embedded controller 222 of the present embodiment executes a start-up procedure in case of receiving the system voltage VS22 for the first time. Namely, when the embedded controller 222 is driven by the system voltage VS22, the embedded controller 222 executes the start-up procedure.

Figure 5:
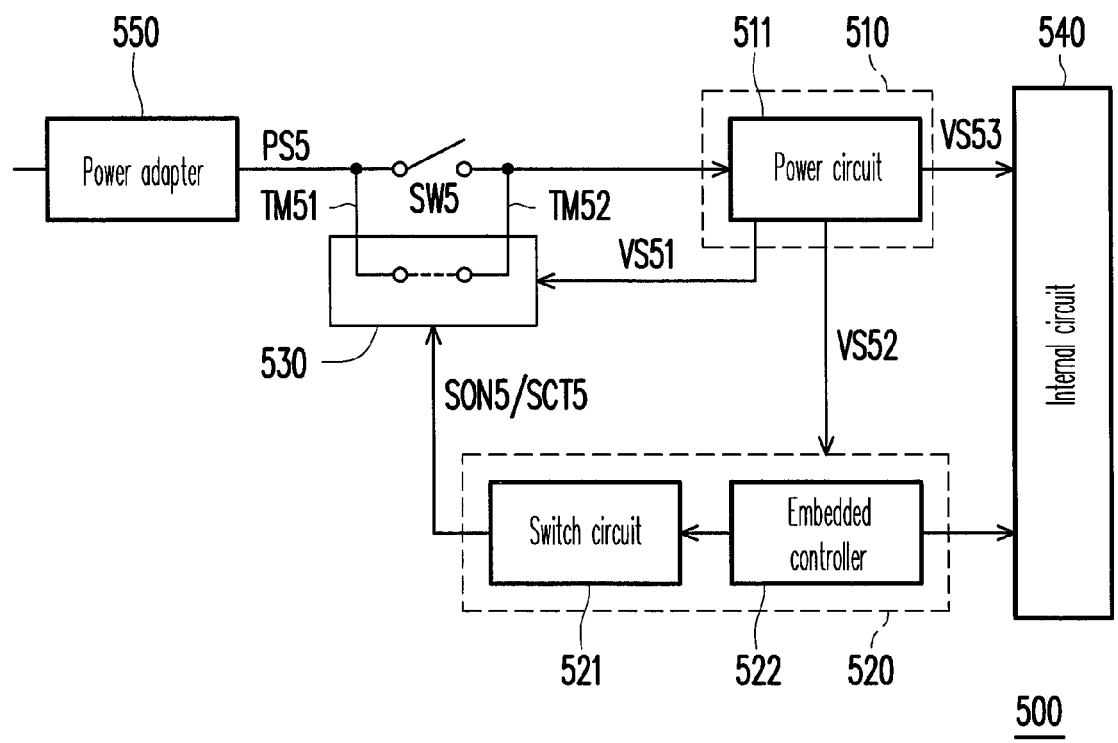
FIG. 5 is a block diagram of an electronic device according to still another embodiment of the invention.

FIG. 5 is a block diagram of an electronic device according to still another embodiment of the invention. Referring to FIG. 5, the electronic device 500 includes a power switch SW5, a power supply unit 510, a control unit 520, a switch unit 530, an internal circuit 540 and a power adapter 550. The power supply unit 510 includes a power circuit 511, and the control unit 520 includes a switch circuit 521 and an embedded controller 522.

Referring to FIG. 5, a first power end of the power switch SW5 is connected to the power adapter 550 for receiving a power PS5, and a second power end of the power switch SW5 is connected to the power supply unit 510. The power PS5 of the present embodiment is a DC voltage, and the power PS5 (the DC voltage) is generated by the power adapter 550 by converting an AC voltage. Moreover, when the power switch SW5 is pressed, the first power end thereof is conducted to the second power end thereof for a predetermined time. Now, the power PS5 is provided to the power supply unit 510, and the electronic device 500 starts up. Moreover, the power circuit 511 in the power supply unit 510 converts the power PS5 (the DC voltage) into system voltages VS51-VS53 for supplying to the switch unit 530, the control unit 520 and the internal unit 540.

Further, the control unit 520 is driven by the system voltage VS52 to operate. Moreover, in an initial stage of starting up the electronic device 500, a first connecting terminal TM51 and a second connecting terminal TM52 of the switch unit 530 can be conducted through the system voltage VS51, so that the power supply unit 510 can continually receive the power PS5 before the control unit 520 is completely driven. Moreover, after the control unit 520 is driven, the control unit 520 provides a power-off signal SCT5 or a power-on signal SON5 to the switch unit 530 according to an operation mode of the electronic device 500.

Regarding a detailed operation of the control unit 520, when the electronic device 500 is the turn-on state, the embedded controller 522 maintains one of a plurality of state signals to the first level, so that the switch circuit 521 provides a setting signal having the second level, i.e. provides the power-on signal SON5. Moreover, when the electronic device 500 is shut down, the embedded controller 522 maintains the state signals to the second level, so that the switch circuit 521 provides the setting signal having the first level, i.e. provides the power-off signal SCT5.

Regarding the power-on signal SON5 and the power-off signal SCT5 generated by the switch circuit 521, the switch unit 530 conducts the first connecting terminal TM51 and the second connecting terminal TM52 according to the power-on signal SON5, so that the power supply unit 510 can continually receive the power PS5. In other words, the control unit 520 controls the switch unit 530 to conduct the first connecting terminal TM51 and the second connecting terminal TM52, so that the power PS5 is still provided to the power supply unit 510 through the switch unit 530 after the first power end and the second power end of the power switch SW5 are disconnected.

Moreover, the switch unit 530 disconnects the first connecting terminal TM51 and the second connecting terminal TM52 according to the power-off signal SCT5, so as to cut off the power PS5 supplied to the electronic device 500. In other words, when the electronic device 500 is shut down, the first connecting terminal TM51 and the second connecting terminal TM52 of the switch unit 530 are disconnected, so as to cut off the power supplied to the electronic device 500. In this way, the electronic device 500 of the present embodiment can achieve an effect of zero power consumption under the shut down state, so as to improve the power-saving performance of the system. Detailed operations and implementations of the circuit block of the present embodiment have been described in the aforementioned embodiment, so that details thereof are not repeated.

In summary, in the invention, the two connecting terminals of the switch unit are connected in parallel to the two power ends of the power switch, and when the electronic device is shut down, the two connecting terminals of the switch unit are disconnected to cut off the power supplied to the electronic device. In this way, the electronic device achieves an effect of zero power consumption under the shut down state, so as to improve the power-saving performance of the system. Moreover, in order to maintain power of the electronic device in the standby state, the hibernation state, the sleep mode or the specific state, when a specific event occurs, the control unit generates the power-on signal according to settings of a plurality of the state signals. In this way, the power-saving mechanism of the electronic device is flexible in utilization.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
a power switch, having a first power end and a second power end, wherein the first power end is used for receiving a power;
a switch unit, having a first connecting terminal and a second connecting terminal, wherein the first connecting terminal and the second connecting terminal of the switch unit are connected in parallel to the first power end and the second power end of the power switch;
a power supply unit, connected to the second power end of the power switch and the second connecting terminal of the switch unit; and
a control unit, connected to the power supply unit and the switch unit, wherein the control unit comprises:
an embedded controller, maintaining one of a plurality of state signals to a first level when the electronic device starts up, and maintaining the state signals to a second level when the electronic device is shut down; and
a switch circuit, connected to the embedded controller, wherein when the first power end and the second power end are conducted for a predetermined time, the power is provided to the power supply unit and the electronic device starts up to allow one of the state signals to be the first level, the switch circuit provides a setting signal having the second level to control the switch unit to conduct the first connecting terminal and the second connecting terminal, so that the power is still provided to the power supply unit through the switch unit after the first power end and the second power end are disconnected, and when the electronic device is shut down to allow the state signals to have the second level, the switch circuit provides the setting signal having the first level to control the switch unit to disconnect the first connecting terminal and the second connecting terminal.

2. The electronic device as claimed in claim 1, wherein the power is an alternating current (AC) voltage, and the power supply unit comprises:
a power adaptor, connected to the second power end of the power switch, and converting the AC voltage into a direct current (DC) voltage; and
a power circuit, connected to the power adaptor, and converting the DC voltage into a system voltage.

3. The electronic device as claimed in claim 1, wherein the power is a DC voltage, and the power supply unit comprises a power circuit, wherein the power circuit is connected to the second power end of the power switch, and converts the DC voltage into a system voltage.

4. The electronic device as claimed in claim 3, further comprising:
a power adaptor, connected to the first power end of the power switch, and converting an AC voltage into the DC voltage.

5. The electronic device as claimed in claim 1, wherein the embedded controller maintains one of the state signals to the first level when a specific event occurs.

6. The electronic device as claimed in claim 1, wherein the state signals comprise a wakeup control signal and a plurality of sleep control signals.

7. The electronic device as claimed in claim 1, wherein the switch circuit comprises:
a first resistor, having a first end and a second end, wherein the first end receives a first voltage, and the second end provides the setting signal; and
a plurality of first switches, connected between the second end of the first resistor and a ground terminal, wherein conducting states of the first switches are determined according to the state signals.

8. The electronic device as claimed in claim 1, wherein the switch unit comprises:
a relay, having the first connecting terminal and the second connecting terminal;
a control circuit, connected to the relay; and
a second switch, connected to the control circuit and a switch circuit of the control unit.

* * * * *